June 10, 1924.
W. J. BOHAN ET AL
1,496,839
COMBINED STEAM AND INTERNAL COMBUSTION ENGINE
Filed March 27, 1918    2 Sheets-Sheet 2
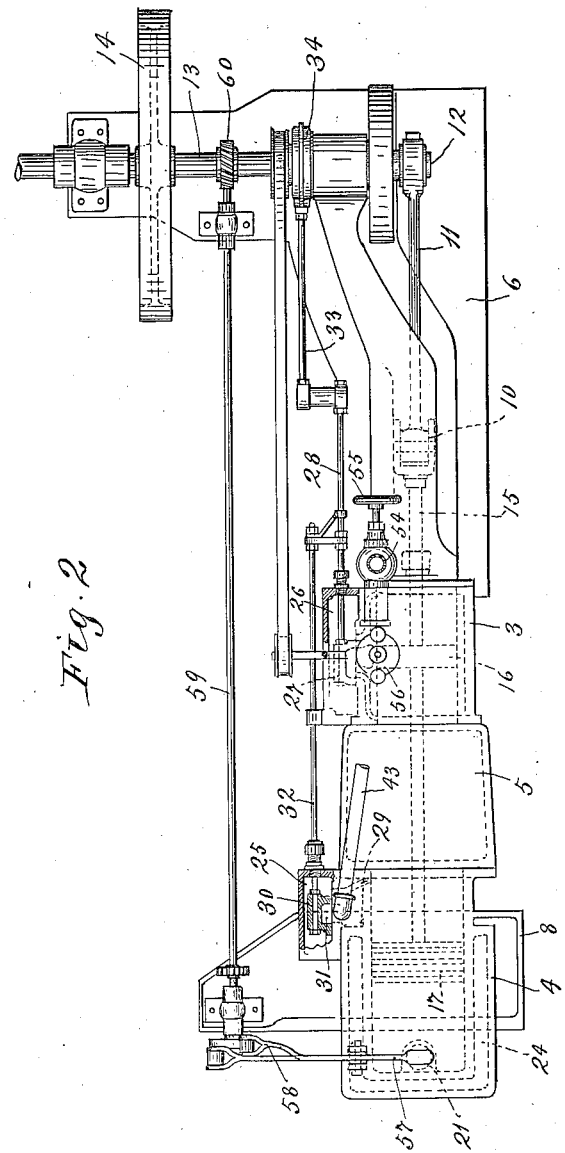

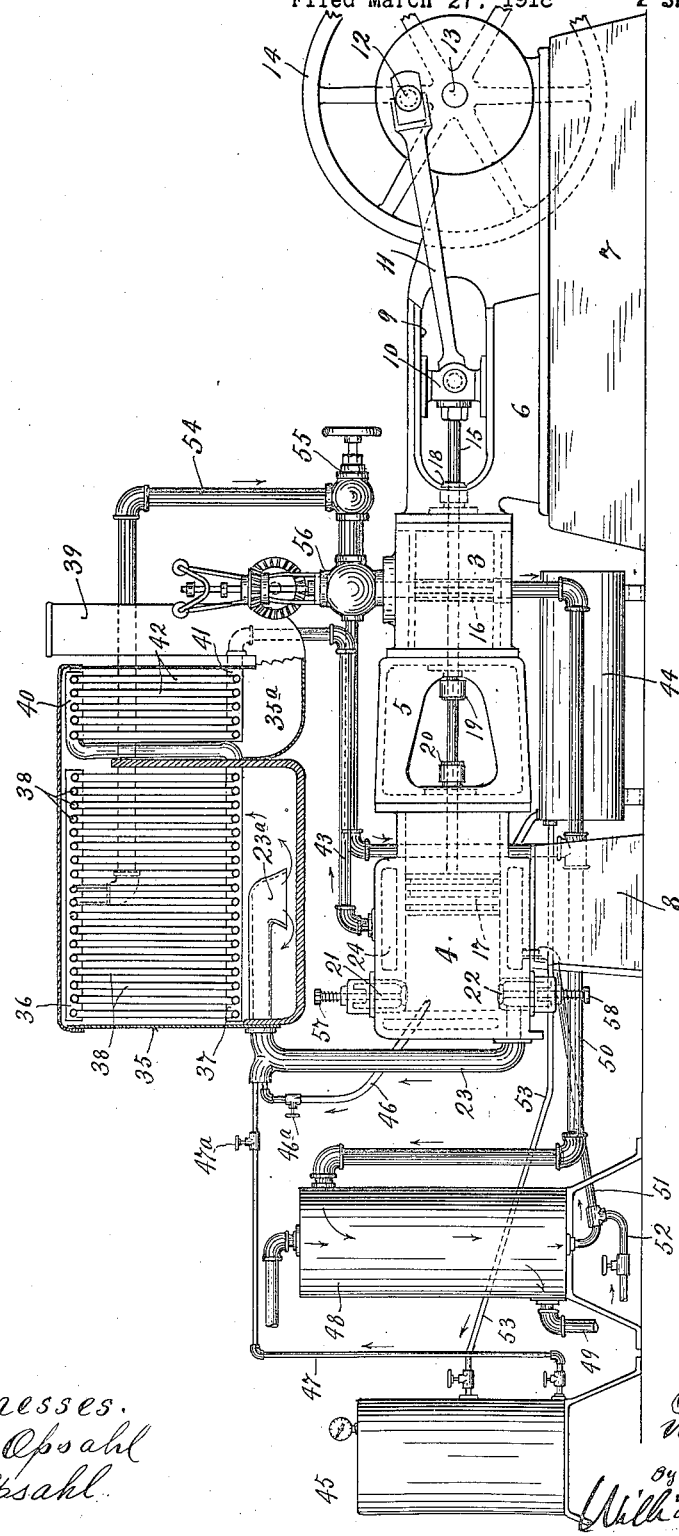

Patented June 10, 1924.

1,496,839

UNITED STATES PATENT OFFICE.

WILLIAM J. BOHAN, OF ST. PAUL, AND RALPH N. BICKLEY, OF MINNEAPOLIS, MINNESOTA.

COMBINED STEAM AND INTERNAL-COMBUSTION ENGINE.

Application filed March 27, 1918. Serial No. 224,989.

*To all whom it may concern:*

Be it known that we, WILLIAM J. BOHAN and RALPH N. BICKLEY, citizens of the United States, residing at St. Paul and Minneapolis, respectively, in the counties of Ramsey and Hennepin and State of Minnesota, have invented certain new and useful Improvements in Combined Steam and Internal-Combustion Engines; and we do hereby declare the following to be a full, clear, and exact description of the invention, such as will enable others skilled in the art to which it appertains to make and use the same.

Our invention has for its object to provide an improved combined steam and internal combustion engine, whereby maximum efficiency per unit of fuel consumption is obtained. Generally stated, the invention consists of the novel devices and combinations of devices hereinafter described and defined in the claims.

In accordance with our invention, a steam engine and an internal combustion engine are connected in tandem for synchronous movements of the pistons of the two, or several engines. The exhaust from the internal combustion engine is utilized to generate or to assist in the generation of steam for operating the steam engine. The efficiency of the combined engine is further increased and still greater economy attained by using the outer end of the cylinder of the internal combustion engine as a secondary steam engine into which steam is introduced to assist in moving the piston in the return or compression stroke.

Preferably, provision is made for introducing a hydrocarbon liquid or vapor and air under compression into the combustion chamber of the boiler. The boiler is preferably a tubular boiler of the flash type. The exhaust steam from the steam engines is carried to a condenser and the water from condensation is used to cool the gas engine and, in quite highly heated condition, is carried from the water jacket of the gas engine to the boiler where it is converted into steam. Thus, the water jacket of the internal combustion engine is utilized as a feed water heater with a resulting saving in heat units. Preferably, the water in passing from the water jacket of the engine to the boiler is passed through an auxiliary feed water heater formed as substantially a part of the boiler.

So far as the broad idea of the invention is concerned, any desired number of steam engines and any desired number of internal combustion engines may be connected for moving in synchronism, and the internal combustion engine or engines may be either of two-cycle or four-cycle type.

One form of the combined engine is illustrated in the accompanying drawings wherein like characters indicate like parts throughout the several views.

Referring to the drawings,

Fig. 1 is a view chiefly in side elevation but with some parts in vertical section showing the complete combined engine and its important accessories; and Fig. 2 is a plan view of the engine proper, certain of the parts being removed.

The numeral 3 indicates the cylinder of a main steam engine, the numeral 4 the cylinder of the internal combustion engine, which two cylinders are shown as rigidly connected by a coupling having a casting 5. One end of the steam engine cylinder 3 is connected to an engine frame 6 that is mounted on a suitable foundation 7. The cylinder of the gas engine is shown as mounted on a suitable foundation 8. The engine frame 6 is provided with the customary cross head guide 9 on which moves a crosshead 10 coupled by a connecting rod 11 to the wrist pin 12 of a crank shaft 13, which crank shaft is journaled in suitable bearings on the frame 6 and carries the customary fly wheel 14.

The crosshead 10 is connected to one end of the steam engine piston rod 15, which rod has a piston 16 that works in the said cylinder 3. Working within the cylinder 4 of the internal combustion engine is a piston 17. The two pistons 16 and 17 are connected in tandem to the same piston rod, which piston rod may be a single integral rod or may be made up of a multiplicity of sections. As shown and preferred, however, the steam engine piston rod 15 is extended into the cylinder 4 and the piston 17 is directly and rigidly secured thereto. In this described arrangement, the extended piston rod 15 works through three stuffing boxes 18, 19 and 20, the first on the front head of the cylinder 3, the second on the rear head of the cylinder 3 and the third on the front end head of the cylinder 4.

In the explosion end of the cylinder 4 of the internal combustion engine, there is the customary or any suitable form of admission valve 21 and exhaust valve 22. This admission valve 21 will receive the explosive mixture in the usual or any suitable way from a carbureter, not shown, but which may be of well known construction. The exhaust valve 22 delivers to the exhaust pipe 23 hereinafter to be further noted. The explosion end of the cylinder 4 is surrounded by an ordinary water jacket 24, which water jacket does not, however, surround the front portion of the said cylinder and leaves a portion of the said front end uncooled for the introduction of steam thereinto. For introducing steam into this front end of the cylinder 4, the latter is provided on one side with a steam chest 25, and likewise, for delivering steam to the steam cylinder 3, said cylinder 3 is provided on one side with the customary steam chest 26 having the usual ports leading to the opposite ends of said cylinder, the said ports being controlled by a slide valve 27 of well known construction having a projecting valve rod 28. The steam chest 25 is connected to the extreme front end of the cylinder 4 through a single port 29 that serves for both admission and exhaust, the admission and exhaust being controlled by a slide valve 30 which has an exhaust port 31. This valve 30 has an extended valve rod 32 that is connected to the valve rod 28 and moves in synchronism therewith. The valve rod 28 is connected by an eccentric rod 33 to an eccentric 34 carried by the engine shaft 13.

Located at any suitable point, but as shown, in the drawings, Fig. 1, in a position above the combined engine, is a tubular boiler of the flash type which comprises a casing or boiler shell 35, upper and lower steam headers 36 and 37, and connecting tubes 38. The shell 35 is shown as extended to form a supplemental combustion chamber 35ᵃ which has a discharge stack 39. Located within the supplemental combustion chamber 35 is a so-called auxiliary water heater made up of an upper header 40, a lower header 41 and connecting tubes 42. The upper header 40 is shown as extended and connected to the lower header 37 of the boiler proper. The lower header 41 of the auxiliary heater is connected by a water pipe 43 to the upper portion of the water jacket 24 of the cylinder 4.

Here it should be noted that the exhaust pipe 23 of the internal combustion engine, is extended into the lower portion of the shell 35 and terminates below the tubes, in a sort of a spreading nozzle 23ᵃ. The numeral 44 indicates an air storage tank which will be kept charged with air at the desired pressure from a compressor, not shown. The numeral 45 indicates a fuel tank which may be assumed to contain gasoline or kerosene. A small air pipe 46 leads from the air storage tank 44 and a small oil pipe 47 leads from the oil tank 45, and these air and oil pipes 46 and 47 are both connected to the delivery oil nozzle end portion of the exhaust pipe 23, so that they will supply additional fuel when greater steam generating heat is required than is afforded by the exhaust from the internal combustion engine. The air is also necessary to complete the combustion of the explosive exhaust gases. The pipes 46 and 47 are provided with suitable valves 46ᵃ and 47ᵃ by means of which they may be opened and closed at will and the flow of air and gas therethrough regulated.

The numeral 48 indicates a condenser of any suitable or well known construction provided, as shown, with water jacketing pipes 49 for cooling the steam delivered thereinto. The exhaust ports of the steam engine cylinder 3 and of the steam acting end of the cylinder 4 are connected to the condenser 48 by a steam pipe 50. The water or condensation from condenser 48 is delivered through a pipe 51 to the lower portion of the water jacket 24 of the cylinder 4; and, as shown, a valve-equipped water supply pipe 52 is connected to the said pipe 51. The fuel supply tank 45 is a closed or air-tight tank and is connected by a valve-equipped air pipe 53 to the air storage tank 44.

Extended from the upper steam header 36 of the boiler is a live steam delivery pipe 54 which leads to both of the heretofore noted steam chests 25 and 26. This live steam pipe 54 is preferably provided with an ordinary globe valve 55, and the supply of steam therethrough to the respective steam chests will be under normal control in running from an ordinary governor controlled steam valve 56 of well known construction. This governor is of the centrifugal type driven from the engine in the well-known manner through gears, and co-operating devices shown in part in Fig. 1.

So far as this invention is concerned, the admission and exhaust valves of the internal combustion engine may be operated in any suitable way and the ignition mechanism, not illustrated, may be of any of the well known approved systems. As shown, however, the said admission and exhaust valves are operated through similar levers 57 and 58 suitably pivoted to the cylinder 4 and subject to cams on a long cam shaft 59 mounted in suitable bearings on the engine framework and connected at its front end to the engine crank shaft 13 by co-operating spiral gears 60, or any other suitable device.

*Operation.*

The operation of the engine, summarized, is substantially as follows:

Steam will, of course, be admitted into the rear end of the steam cylinder 3 at, or approximately at the same time that the explosion takes place in the compression end of the cylinder 4. If the internal combustion engine is of the two-cycle type, then there will be an explosion for each admission of steam into the rear end of the cylinder 3, but if the said internal combustion engine is of the four-cycle type, there will be an explosion for each alternate time that steam is admitted into the rear end of said cylinder 3. Here it may be stated that where two internal combustion engines are connected in tandem to the piston of the combined engine, and the said engines are of the four-cycle type, the explosion of the two internal combination engines would be timed for alternate action so that there would be an explosion for each time that steam is introduced into the rear end of the steam cylinder.

Simultaneously, with the introduction of steam into the front end of the cylinder 3, steam will be admitted from the steam chest 25 into the front end of cylinder 4 so that both pistons 16 and 17 will be subject to live steam for producing compression of gases within the cylinder of the internal combustion engine. Of course, the exhaust from the steam cylinder and from the front end of the cylinder 4 will be timed to take place during the entire or substantially the entire forward movement of the combined pistons.

The exhaust steam from the engine or engines will be delivered into the condenser, which, in itself, operates, the engines under partial vacuum. The water of condensation is delivered to the water jacket of the cylinder 4 to keep the same properly cooled and to raise the temperature of the water which is subsequently to be generated into steam. As this quite highly heated water passes through the auxiliary heater 40, 41 and 42, it will be raised nearly to the point of steam generation, so that when it is then delivered into the boiler proper it will be almost instantly generated into steam. The manner in which the steam is delivered from the boiler to the steam chests 25 and 26 has already been fully noted.

By the regulation of the supply of air from pipe 46 and of the hydrocarbon or oil from pipe 47, just the desired heat required in the boiler for working up the required generation of steam may be produced without waste of fuel. Substantially all of the heat from the exhaust from the internal combustion engine is utilized in this steam generating action and the additional supply of hydrocarbon or oil is only to supply the additional power that may be required to operate the combined engine at its fullest capacity. This combined engine, therefore, has a very wide range in power capacity, that is, it may be run solely as a gas engine; it may be run solely as a steam engine; it may be run as a combined steam and gas engine in which only the exhaust from the gas engine is used to generate steam; or finally, it may be used in its full capacity as a combined steam engine and gas engine in which the full generation of steam is produced by the utilization of exhaust augmented by an additional supply of hydrocarbon gas or oil fuel.

What we claim is:

1. The combination with a steam engine and an internal combustion engine having their cylinders and pistons connected in tandem for synchronous action, of a steam boiler, connections for running the exhaust from said internal combustion engine to said boiler to heat the same, connections from said boiler for delivering live steam to said steam engine and to one end of the internal combustion engine cylinder, a condenser connected to the exhaust from said steam engine, means for circulating the water of condensation around the other end of said internal combustion engine cylinder, an auxiliary fuel supply for said boiler, and pressure means acting thereon.

2. The combination with a cylinder and piston of a steam engine, of a cylinder and piston of an internal combustion engine, said cylinders being arranged in tandem, a common piston rod for said pistons and cylinders, a crank shaft, a connecting rod connecting said crank shaft and piston rods, a valve for admitting a fuel mixture into one end of said internal combustion cylinder, a valve for admitting steam into the other end of said internal combustion cylinder, a valve for admitting steam into both ends of said steam cylinder, said last named valves being operated by a common valve rod, and a valve rod for operating said first mentioned valve, both of said valve rods being operated by said crank shaft.

3. The combination with a cylinder and piston of an internal combustion engine, of the cylinder and piston of a steam engine, said pistons being connected for combined movement, a boiler, a condenser, means for delivering the exhaust from said steam cylinder to the condenser, means for circulating the water of condensation from the condenser about one end only of the cylinder of the internal combustion engine, the other end being uncooled to act as a steam cylinder, means for then delivering said water to the boiler, and means for delivering steam from said boiler to said steam engine cylinder.

In testimony whereof we affix our signatures in presence of two witnesses.

WILLIAM J. BOHAN.
RALPH N. BICKLEY.

Witnesses:
BERNICE G. BAUMANN,
HARRY D. KILGORE.